No. 803,645. PATENTED NOV. 7, 1905.
F. B. UPTON.
CASTER.
APPLICATION FILED NOV. 10, 1904.

Witnesses:
Inventor:
F. B. Upton
by Carr & Carr
Attys

UNITED STATES PATENT OFFICE.

FRANK B. UPTON, OF ST. LOUIS, MISSOURI.

CASTER.

No. 803,645.  Specification of Letters Patent.  Patented Nov. 7, 1905.

Application filed November 10, 1904. Serial No. 232,082.

*To all whom it may concern:*

Be it known that I, FRANK B. UPTON, a citizen of the United States, and a resident of the city of St. Louis, State of Missouri, have invented a new and useful Improvement in Casters, of which the following is a specification.

My invention relates to casters for furniture and the like, and has for its principal objects to provide a caster that may be easily inserted and will be strongly held in its socket, to provide a caster having securing means that will be held in the position of its maximum force by the weight of the object to which it is attached, to provide securing means for a caster having means for positively spreading friction members, and other objects hereinafter more fully appearing.

My invention consists in the parts and in the arrangements and combinations of parts hereinafter described and claimed.

Figure 1:
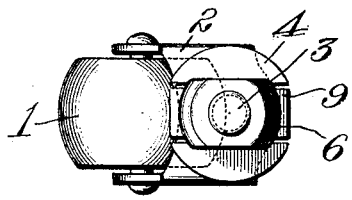
Figure 2:
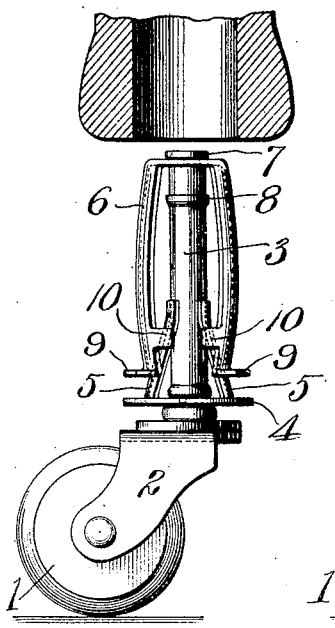
Figure 3:
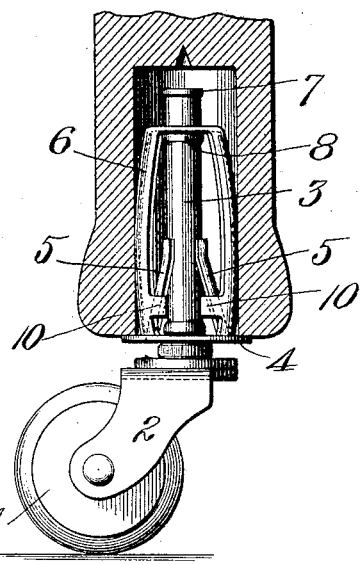
Figure 4:
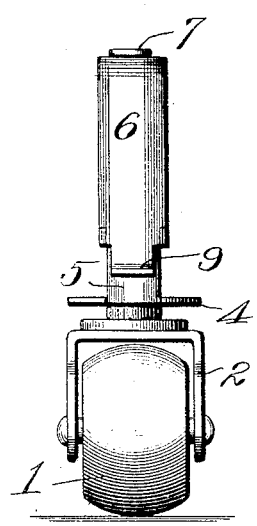
Figure 5:
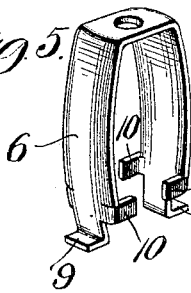
Figures 6, 7:
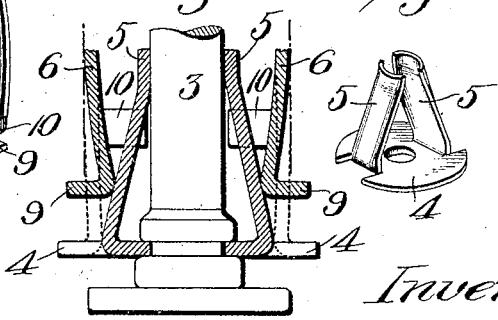

In the accompanying drawings, forming a part of this specification, and wherein like symbols refer to like parts wherever they occur, Figure 1 is a plan view of the caster. Fig. 2 is a side view of the caster adjusted to be inserted in a socket, a sectional view of a portion of a socket being shown above it. Fig. 3 is a side view of the caster in position in a socket, the latter being shown in section. Fig 4 is a front view of the caster. Fig. 5 is a perspective view of the friction member. Fig. 6 is a perspective view of the spreading member; and Fig. 7 is a sectional view of the lower ends of the friction member and the spreading member, the lowermost position of the ends of the friction member being shown in dotted lines.

A roller 1, mounted in a roller-frame 2, is used in the present caster. Both the parts are shown as of ordinary form and may be of any type desired. A stem 3 is secured to the roller-frame 2 in the usual manner. The stem itself is, however, modified, as will appear below.

At the lower end of the stem 3 a disk 4 is secured, preferably by upsetting the stem. The disk is not firmly secured, but is free to rotate with respect to the stem. At diametrically opposite sides of the disk integral wings are turned up into contact with the stem and form inclines 5, which serve to spread the friction member, hereinafter described. The wings comprise a portion of the metal within the area described by the radius of the disk, and thus rectangular notches occur on opposite sides of the disk at the bottoms of the inclines. The diameter of the disk 4 is somewhat greater than the diameter of the socket in which the caster is to be placed, so that the object supported by the caster will rest upon the disk 4.

A substantially U-shaped expansible friction member 6, of resilient metal, is rotatably and slidably mounted upon the stem between shoulders 7 8, preferably formed thereon by upsetting. The branches of the friction member extend downwardly and are provided at their lower ends with horizontally-extending projections 9. The branches are gently curved in a vertical plane, the bulge being such that the caster can just be freely inserted in its socket when the friction member is in its uppermost position. In a horizontal plane the branches are curved to conform to the walls of the socket. The projections 9 extend radially far enough to be always engaged by the wall of the socket in which the caster is placed whatever the position of the friction member. Guides 10 are bent up at each side of each branch of the friction member in position to engage the inclines and prevent relative rotation.

When it is desired to insert the caster in a socket, the friction member is raised to its uppermost position. The caster can then be easily inserted in the socket, as the branches of the friction member will touch the walls of the socket very lightly. When the projections at the lower ends of the friction member strike the bottom of the object containing the socket, further inward movement of the friction member is stopped. The stem of the caster and the spreading member can now move relatively to the friction member. As a result of such movement the branches of the friction member will be spread apart and will bear with force against the walls of the socket. The branches will be more or less straightened and the area of their contact with the walls of the socket will hence be increased. The caster will thus be forcibly held in place.

Obviously my device is capable of considerable modification within the scope of my invention, and therefore I do not wish to be limited to the specific construction shown and described.

What I claim as my invention, and desire to secure by Letters Patent, is—

1. A caster comprising a roller, a mounting therefor, and fastening means comprising an expansible member and means to expand said member by relative bodily movement of said expansible member and expanding means.

2. A caster comprising a roller, a mounting therefor, and fastening means comprising an expansible member, longitudinally movable with respect to said mounting, and means, longitudinally immovable with respect to said mounting, to expand said expansible member.

3. A caster comprising a roller, a roller-frame, a stem secured to said roller-frame, a wedge-shaped member secured to said stem, and an expansible member movably mounted on said stem and engaging said wedge-shaped member whereby said expansible member may be expanded.

4. A caster comprising a roller, a mounting therefor, and fastening means comprising an expansible member conforming to the shape of the socket in which it is to be placed and a relatively movable wedge-shaped member to expand said expansible member.

5. A caster comprising a roller, a mounting therefor, and fastening means comprising an expansible member, means to expand said member, and means to engage the walls of a socket in which the expansible member is to be placed whereby relative movement of said member and said means may be caused by the weight of the object containing the socket.

6. A caster comprising a roller, a mounting therefor, and fastening means on said mounting and comprising an expansible bifurcated member having outwardly-extending projections at the ends of its bifurcations and a disk provided with inclined members located between and in engagement with the ends of the bifurcations of said expansible member.

7. A caster comprising a roller, a roller-frame, a stem on said frame, a member provided with an inclined surface rotatably mounted on said stem, an expansible member rotatably mounted on said stem and arranged to engage said inclined surface, and means to prevent relative rotation of said members.

8. A caster comprising a roller, a mounting therefor, and fastening means comprising an expansible member and rigid means to expand said member by relative movement of said expansible member and expanding means.

In testimony whereof I have signed my name to this specification, in the presence of two subscribing witnesses, this 7th day of November, 1904.

FRANK B. UPTON.

Witnesses:
   FRED F. REISNER,
   J. B. MEGOWN.